United States Patent
Pfleging et al.

(10) Patent No.: US 7,929,679 B2
(45) Date of Patent: Apr. 19, 2011

(54) MUTING CONFERENCE CALL HOLD MUSIC

(75) Inventors: Gerald W. Pfleging, Batavia, IL (US);
Stuart W. Schmidt, Roselle, IL (US);
George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1003 days.

(21) Appl. No.: 11/385,079

(22) Filed: Mar. 21, 2006

(65) Prior Publication Data

US 2007/0223673 A1 Sep. 27, 2007

(51) Int. Cl.
*H04M 3/42* (2006.01)
(52) U.S. Cl. .................................. 379/202.01; 379/158
(58) Field of Classification Search ............ 379/202.01, 379/204.01, 206.01, 207.01, 158; 370/260
See application file for complete search history.

(56) References Cited

U.S. PATENT DOCUMENTS

| | | | |
|---|---|---|---|
| 5,550,906 A * | 8/1996 | Chau et al. ............... | 379/201.05 |
| 6,556,670 B1 * | 4/2003 | Horn ........................ | 379/202.01 |
| 6,597,667 B1 * | 7/2003 | Cerna ........................... | 370/260 |
| 6,839,416 B1 * | 1/2005 | Shaffer .................... | 379/202.01 |
| 7,675,873 B2 * | 3/2010 | Krstulich ..................... | 370/260 |
| 2003/0128830 A1 * | 7/2003 | Coffman et al. ......... | 379/202.01 |
| 2003/0235277 A1 * | 12/2003 | Fuller et al. ............... | 379/88.13 |
| 2004/0128137 A1 * | 7/2004 | Bush et al. .................... | 704/275 |
| 2006/0067500 A1 * | 3/2006 | Christofferson et al. | 379/202.01 |
| 2007/0117508 A1 * | 5/2007 | Jachner ....................... | 455/3.06 |

\* cited by examiner

*Primary Examiner* — William J Deane
(74) *Attorney, Agent, or Firm* — Carmen Patti Law Group, LLC

(57) ABSTRACT

A switching system that provides conference call functionality can mute music played into the conference call by the muting of a conference call participant. The muting of conference call music can be accomplished by controlling the switch's connection to a music on hold source or by controlling the music on hold device.

28 Claims, 4 Drawing Sheets

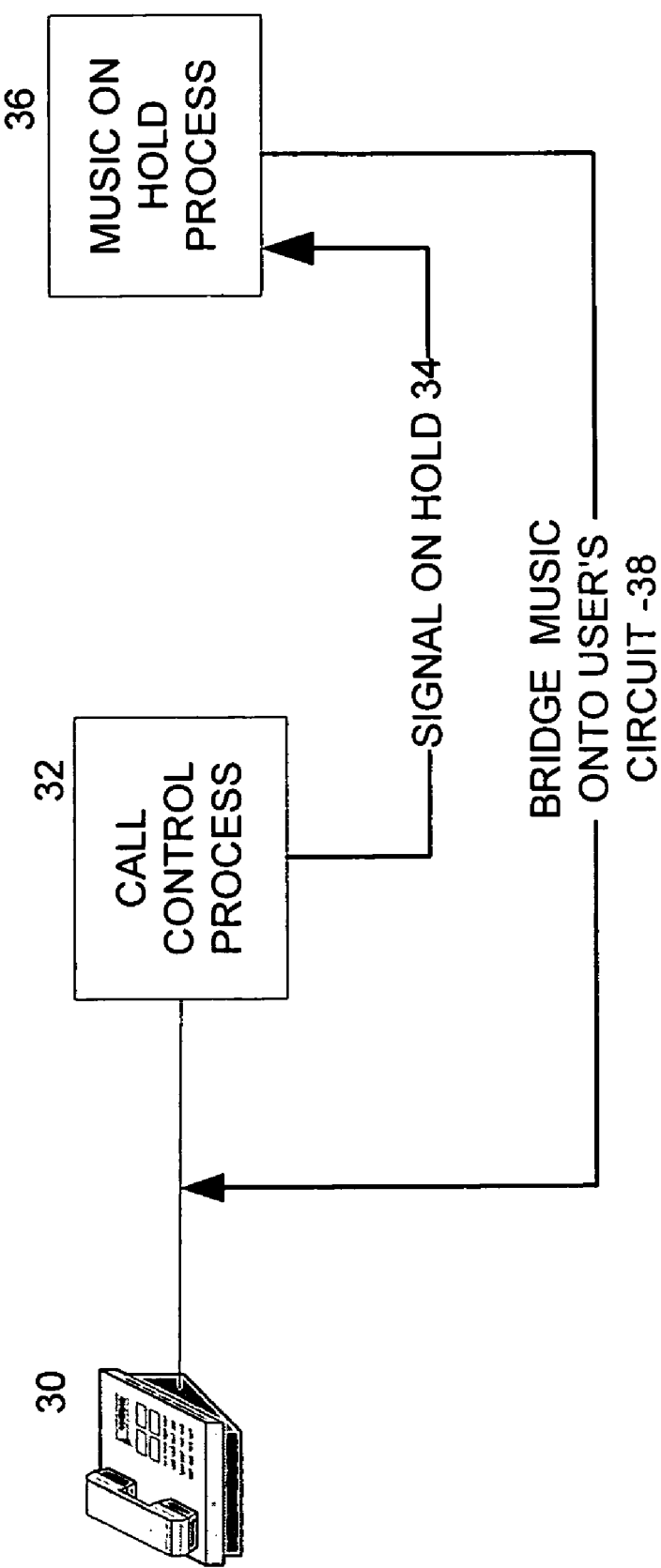

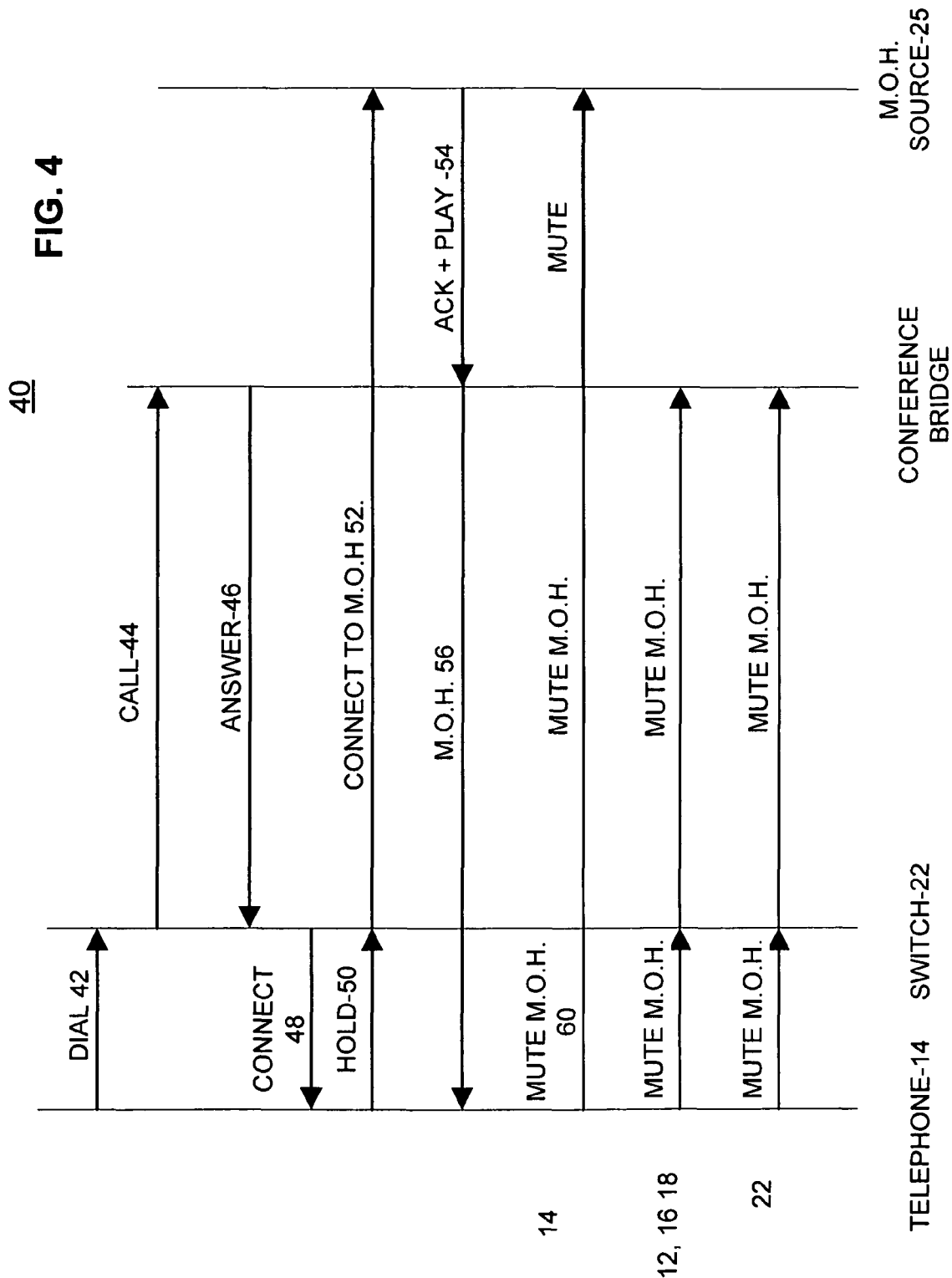

MUTING CONFERENCE CALL HOLD MUSIC

TECHNICAL FIELD

The invention relates generally to telecommunications systems and more particularly to conference calling features.

BACKGROUND

"Conference calls" as they are known allow three or more parties to a single telephone call to talk to each other at the same time and are known to be highly effective in allowing a group of people to confer with each other simultaneously. Conference calls are usually set up by one party being a "host" who has access to a switching system having the ability to conference other callers together. A conference call is usually set up by the parties dialing a telephone number and entering an access code.

Often times, a participant to a conference call dials into such a call from a switching system that will allow the participant to the conference call to place his connection in a "hold" status, by which the caller temporarily disconnects himself or herself from the conference call. A relatively well-known feature of such a local switching system is the transmission of background music or audio to a connection when a person has placed his connection status on hold. In other words, when a party to a conference call places himself on hold, the switching system through which that party connected him to the conference call will sometimes place music or other background audio into the conference call to the detriment of the other call's participants.

When a participant to a multi-party conference call temporarily drops out of a call and into a "hold" status, the substitution of that party's connection with music or other background music can interfere with the remaining party's effective use of the conference call, Thus, a need exists for a method and apparatus by which music or other background audio that might be transmitted into a conference call by a switch or switching system when a participant goes on hold, can be shut off by one or more of the remaining participants.

SUMMARY

The invention in one implementation encompasses an apparatus for muting the music or other background audio transmitted into a conference call when a participant to the call goes on hold. (For purposes of brevity, as used hereinafter, the term "music" should be considered to mean all types and forms of audio transmitted into a conference call when a party goes on hold.)

The apparatus comprises a switching system that receives one or more commands or signal from a remaining conference call participant and thereafter sends a separate and different command or signal to the source of the conference call music to shut off the music. In another embodiment, the apparatus comprises a switching system that routes a command or signal from a remaining conference call participant to a conference call music-on-hold music source which causes the music-on-hold source to shut off the music.

Another implementation of the invention encompasses a method of recognizing a command or signal from a conference call participant, which causes a source of music to stop sending music into a conference call. In one embodiment, there is provided an apparatus comprising a teleconferencing switching system for conferencing together at the same time, three or more parties to a conference call. The teleconferencing switching system is comprised of a switch fabric that receives information-bearing signals from each of a plurality of callers and which re-transmits information-bearing signals it receives to each caller of said plurality of callers in order to allow the parties to the call to communication with each other.

A computer that is coupled to and which controls the telecommunications switch fabric is also coupled to a computer storage media that stores storing computer program instructions that cause the computer to receive and recognize a first control signal from one of a conference call participant. The first control signal is recognized by the computer as a command to shut off music transmitted into the switch fabric from another system. Accordingly, a second control signal is sent to the local switching system of a party to the conference call who went on hold and which thereby caused the transmission of music into the conference call. The second control signal causes the music-on-hold to be shut off.

In another embodiment, there is provided a method for managing background audio signals sent by a party's switching system when a party goes on hold. The method includes detecting a first audio signal provided to the conference call by a first party's temporary disconnection from the conference call. Thereafter, a control signal is transmitted to the first party's switching system that causes the first party's switching system to suspend transmission of the first audio signal.

DESCRIPTION OF THE DRAWINGS

Features of example implementations of the invention will become apparent from the description, the claims, and the accompanying drawings in which:

FIG. 3 is a block diagram illustrating the logic or commands by which music-on-hold is provided into a conference call; and FIG. 4 is a flow diagram illustrating the sequence of commands to mute or inhibit conference call music on hold.

DETAILED DESCRIPTION

Figure 1:
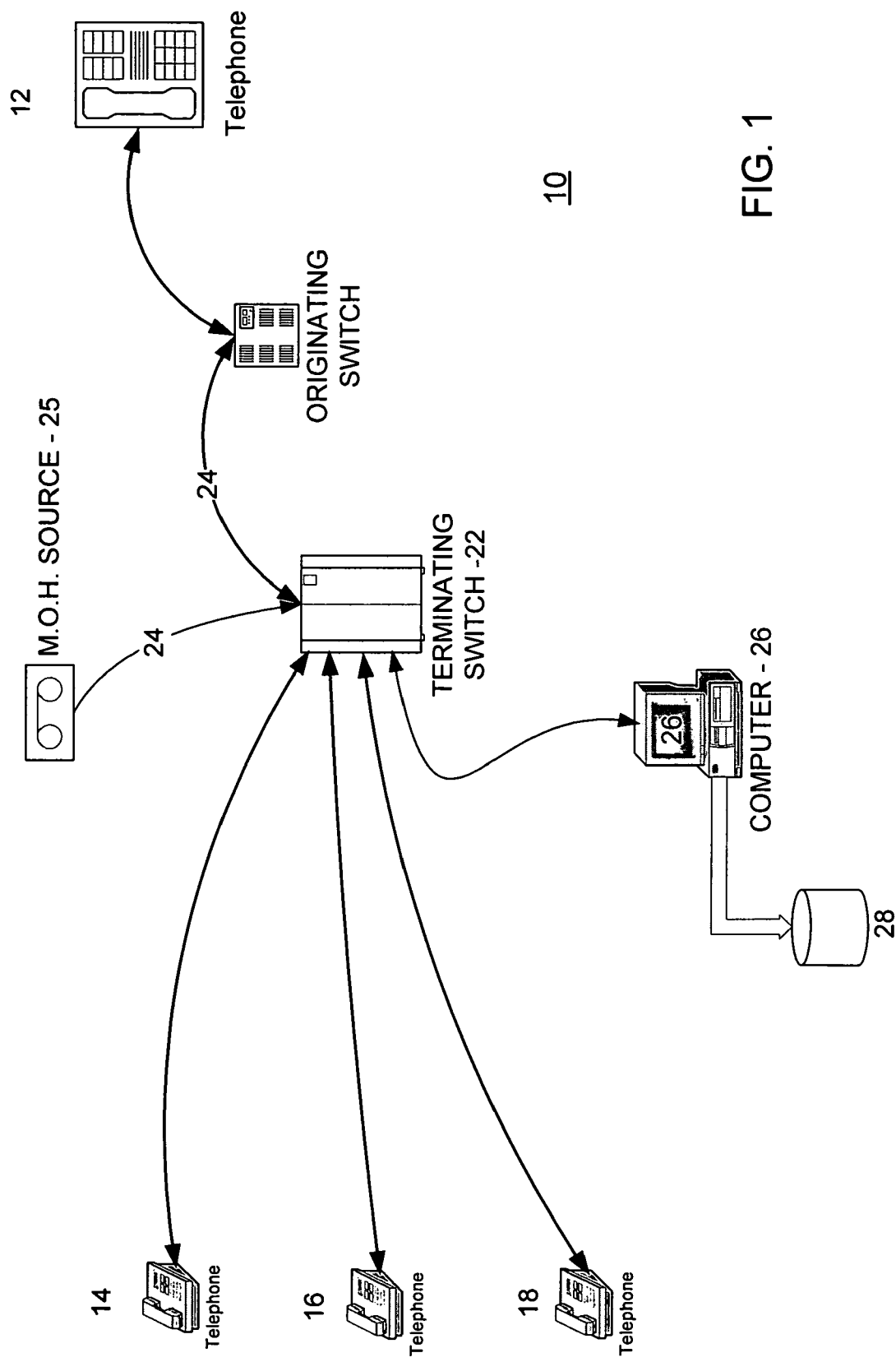
FIG. 1 is a block diagram representation of a conference call through a terminating switching system and wherein a separate music-on-hold source is coupled to the terminating switching system hosting the conference call.

Turning to FIG. 1, an apparatus 10 in one embodiment comprises a switching network 10 having a terminating switch 22 that provides conference call capability to several different parties or callers 12, 14, 16 and 18. As shown in this figure, a first a terminating switching system 22 couples each of the callers 12, 14, 16 and 18 to a switch fabric or switching network, not shown but well known to those of ordinary skill in the art. The switch fabric, which is also sometimes referred to as a conference call bridge, is switching circuitry through which each of the callers 12, 14, 16 and 18 are able to communicate with each other. The terminating switch 22 also provides a signaling pathway between the callers 12, 14, 16 and 18 such that conference call control signals that a caller sends to the terminating switch 22, are routed by the terminating switch 22 to either a caller or another device in the switching network 10.

It is important to note that one caller 12 is considered to be and is referred to herein as the conference call "host." As shown in the figure, the host 12 is coupled to the terminating switch 22 by an originating switch 13 and is the party to the conference call who set up the call, takes down or terminates the call and controls the call, which takes place through the terminating switch via commands that the host 12 sends to the terminating switch 22 through the originating switch 13.

In the course of a conference call, when one of the callers, e.g., the caller identified by reference numeral 14 for example, sends a signal to the terminating switch 22 that he or she wishes his connection to the call to be placed into a "hold" status, that particular caller does so by sending a first control signal to the terminating switch 22, which instructs the terminating switch 22 to temporarily suspend or mute that caller's (14) connection to the conference call that is currently being conducted through the terminating switch 22. A control signal to the terminating switch 22 from the caller 14 that the terminating switch 22 should mute the caller 14 connection can take many different forms, including but not limited to, one or more dual-tone, multi-frequency (DTMF) signals generated by the keypad on the caller 14 telephone. The control signal can also be embodied in one or more TCP/IP data packets sent to the terminating switch via e-mail or even one or more spoken words uttered by the caller 14 and recognized by voice recognition software running on a computer 26, which monitors the call's progress through the terminating switch 22.

When this first control signal from the caller 14 to the terminating switch 22 is received at the terminating switch 22, the switch fabric within the terminating switch 22 routes the signal to the aforementioned computer 26, which is programmed to recognize the first control signal as one by which the terminating switch 22 will place the caller 14 on hold. In the network 10 shown in FIG. 1, a control signal to place a caller 14 on hold will cause a music-on-hold (MOH) source 25 to routed into the conference call in place of the caller 14 who instructed the switching network 22 to place his connection on hold.

When the computer 26 controlling the terminating switch 22 causes the MOH source 25 to be connected to the conference call, all of the other call's participants will hear the music that originates from the MOH source 25. If the event that remaining call participants 12, 16 and 18 wish to suspend or terminate the transmission of music from the MOH source 25 into the conference call, in one embodiment of the network 10, one or more of the remaining participants 12, 16 and 18 can send a second control signal to the terminating switch 22, which the computer 26 is programmed to recognize as a control signal that will causing the terminating switch 22 to suspend transmission of an first audio signal into the conference call by either disconnecting the MOH source 25 from the switch fabric or which will cause the MOH source 25 to shut off.

The control signals to mute conference call music can be sent from the callers using in-band signals, i.e., audio tones. Signals between the switching system equipment can be sent in-band or out-of-band, such as by way of SS7 signaling messages.

As can be seen in FIG. 1, the computer 26 is operatively coupled to and controls the terminating switch 22 as well as all of the switching circuitry within the terminating switch 22 including telecommunications switch fabric within the terminating switch 22. As can also be seen in FIG. 1, the computer 26 is coupled to storage media 28, which can be embodied as one or more magnetic or optical disk drives, magnetic tape or semiconductor memory.

As is well known in the computer art, instructions stored in memory imbue a processor or computer 26 with the ability to perform various functions. In FIG. 1, computer program instructions stored in the storage media 28 imbue the computer 26 with the ability to receive audio and other control signals that originate from the parties or callers 12, 14, 16 and 18, each of which is directly or indirectly coupled to the terminating switch 22. Switching circuitry within the terminating switch 22 enables the signals from the callers to be routed to the conference call participants.

Computer program instructions stored in the media 28 enable the computer to recognize audio or other data signals as being a signal to place a caller on hold. Yet other instructions in the storage media 28 enable the computer 26 to recognize a second signal as one by which the computer 26 should disconnect a MOH source from the conference call in progress between the callers.

Figure 2:
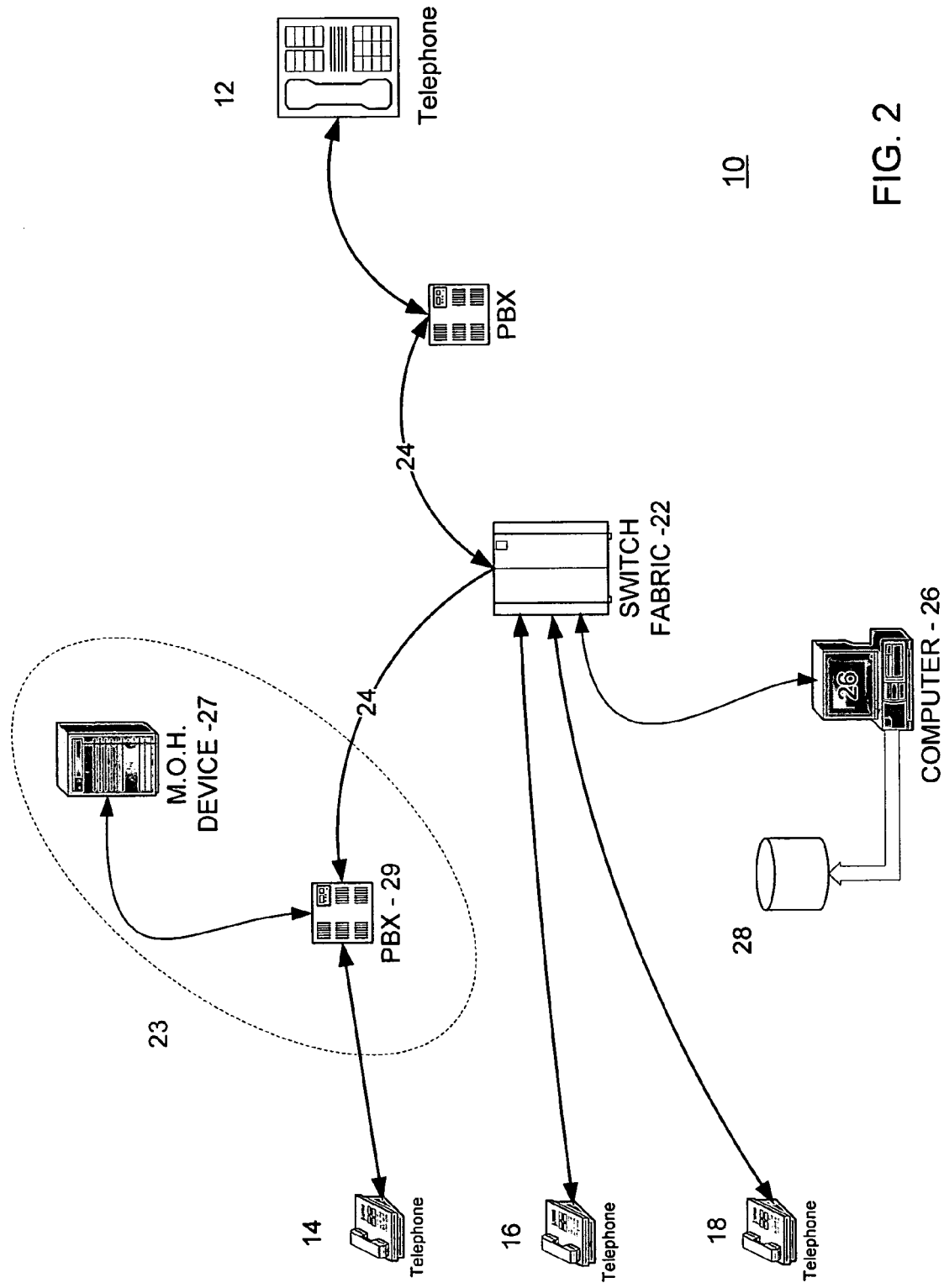
FIG. 2 is a block diagram representation of a second conference call through a terminating switching system but in which the music-on-hold source is part of the switching equipment through which a conference call participant is connected to the call.

Turning to FIG. 2, a second embodiment of an apparatus comprises a switching network 10 having a switch fabric 22 that provides or hosts a conference call to several different parties or callers 12, 14, 16 and 18. As shown in this figure, the switch fabric 22 is operatively coupled to the aforementioned computer 26, which controls the switch fabric 22, but in FIG. 2, the source of music when a caller is placed on hold, is a music on hold device 27 that is part of the switching equipment 23 by which one of the callers 14 accesses the switch fabric 22 as well as other switching systems. Put another way, in FIG. 2, the MOH device 27 is part of the switching equipment 23, including a private branch exchange (PBX) by which the caller 14 makes telephone calls.

Unlike the embodiment shown in FIG. 1, in FIG.2, the placement of a first caller on hold is accomplished by the first caller's PBX 29. In FIG. 2, the PBX 29 informs the switch fabric 22 and its controlling computer 26 that the caller 14 is going on hold. The PBX 29 then routes music from the MOH device 27 into the conference call circuitry in the switch fabric 22.

Similar to the embodiment shown in FIG. 1, when a first caller 14 goes on hold and his switching equipment 23 places music into the conference call, the computer 26 controlling the conference call can mute the music in two different ways.

When music is heard by the remaining participants 12, 16 and 18, or perhaps detected by the computer 26, the computer 26 can mute the music by either suspending incoming audio signals from the first caller 14, or, the computer 26 can send a signal to the PBX 29 or the MOH device 27 that instructs the PBX 29 to sever the connection to the MOH device 27 or which instructs the MOH device 27 to shut off the music. Yet another way to mute music on hold is for the remaining conference call participants to instruct the computer 26 to mute the music by sending the aforementioned commands to either the switch fabric 22 or the PBX 29.

For purposes of clarity, FIG. 3 briefly and simply illustrates the process of placing music on hold, into a conference call. In FIG. 3, a conference call participant 30 sends a control signal to the program or software running in a switching system (not shown in FIG. 3) that controls call processing. Such a control signal to the call control process 32 in a switching system triggers a signal 34 to a second program 36 that controls the transmission of music on hold. The music on hold software 36 sends a control signal 38 to switching system hardware, also known as a conference call bridge, which causes a physical connection to be made to a source of music or other background audio signals, which are then routed into the conference call.

With the foregoing in mind, reference is now made to FIG. 4, which displays the steps of a method 40 for managing background audio signals, such as music, which are sent into a switching system when a party to a conference call goes on hold.

FIG. 4 includes a first step 42 of dialing into the conference call switching system, such as the terminating switch 22 of FIG. 1 or the switch fabric 22 of FIG. 2. As shown in this figure, in step 44, the switch 22 directs the call to a conference bridge, which is not shown in FIG. 1 or 2 but which can be considered to be any sort of switching systems or network by which multiple parties are placed into conference call together. In step 46, the conference bridge sends an answer signal to the switch 22, which in turn makes a connection 48 for the caller 14 into the conference bridge.

In step 50, the caller 14 sends a "hold" signal to the switch 22, notifying the switch that the caller 14 wishes to place his connection to the bridge on hold. A signal 52 is sent by the switch 22 to the MOH source 25, which acknowledges the MOH request and plays music or other audio in step 54 to the switch 22 and the other participants in step 56.

In step 60, a mute-music-on-hold signal is sent in step 60. As set forth above, a mute-music-on-hold signal can be send by remaining participants 12, 16, 18 or autonomously by a computer 26 controlling the conference call. Note, however, that in FIG. 4, the caller 14 is shown as sending the mute-music-on-hold signal, which should be considered to be yet another embodiment of the invention disclosed and claimed here.

Those of ordinary skill in the art will recognize that the signals by which music on hold is initiated and muted can be in-band DTMF signals mentioned above or still other in-band tones. The signals between the computer 26 and switching systems and signals between switching systems could also be signals that are transmitted over a common channel signaling system, such as the nearly ubiquitous "SS7" signaling channel identified by reference numeral 24 in FIGS. 1 and 2. The control signals could also be sent using TCP/IP data packets as well.

As for the switch equipment depicted in FIGS. 1 and 2, those of ordinary skill in the art will recognized that the teleconferencing switching systems could be either synchronous or asynchronous switch.

The steps or operations described herein are just examples. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. In a conference call of three or more parties where each party is coupled to the call through a corresponding switching system, a method of managing background audio signals sent by a party's switching system when a party goes on hold comprising the steps of:
   a) detecting a first audio signal provided to said conference call by a first party's temporary disconnection from the conference call; and
   b) transmitting, via a computer associated with said corresponding switching system, a control signal to said first party's switching system that causes said first party's switching system to suspend transmission of said first audio signal;
   wherein said corresponding switching system comprises a switch fabric as a conference call bridge, and wherein said control signal instructs said first party's switching system to disconnect a source of said first audio signal from said switch fabric or cause said source of said first audio signal to shut off to suspend said transmission of said first audio signal.

2. The method of claim 1, wherein said control signal is transmitted as an in-band audio signal.

3. The method of claim 1, wherein said control signal is transmitted over a common channel signaling system.

4. The method of claim 1, wherein said control signal is transmitted over an SS7 signaling channel.

5. The method of claim 1, wherein the step of detecting a first audio signal further comprises the step of manually recognizing said first audio signal to be one of music and white noise.

6. The method of claim 1, wherein the step of detecting a first audio signal further comprises the step of a computer recognizing said first audio signal to be one of music and white noise under software control.

7. The method of claim 1, wherein said first audio signal is music.

8. The method of claim 1, wherein said first audio signal is white noise.

9. The method of claim 1, wherein said control signal is transmitted as one or more dual-tone multi-frequency (DTMF) tones.

10. The method of claim 1, wherein said control signal is transmitted using TCP/IP data.

11. The method of claim 1, wherein said computer controls said switch fabric of said corresponding switching system.

12. A teleconferencing switching system for conferencing together at the same time, three or more parties to a conference call, each party to the conference call being coupled to the teleconferencing switching system through a corresponding local switching system, the teleconferencing switching system being comprised of:
   a) a switch fabric that receives information-bearing signals from each of a plurality of callers and which re-transmits received information-bearing signals to each caller of said plurality of callers, wherein said switch fabric comprises a conference call bridge;
   b) a computer operatively coupled to and controlling said switch fabric; and
   c) a computer storage media operatively coupled to said computer, said computer storage media storing computer program instructions which when they are executed cause the computer to:
      i) receive audio signals that originate from said three or more parties or switching systems to which said three or more parties are coupled to and distribute said audio signals to conference call participants;
      ii) detect the reception of a first control signal from a first party to the conference call;
      iii) upon reception of said first control signal, transmit a second control signal to a local switching system of a second party to said conference call, said second control signal causing the second party's local switching system to suspend transmission of an first audio signal into said conference call, and wherein said second control signal instructs said second party's local switching system to disconnect a source of said first audio signal from said switch fabric or cause said source of said first audio signal to shut off to suspend said transmission of said first audio signal.

13. The teleconferencing switching system of claim 12 wherein said switch fabric is a synchronous switch.

14. The teleconferencing switching system of claim 12 wherein said switch fabric is an asynchronous switch.

15. The teleconferencing switching system of claim 12, wherein said first control signal is an in-band audio signal from said first party's telephone.

16. The teleconferencing switching system of claim 12, wherein the first control signal is a SS7 signaling channel.

17. The teleconferencing switching system of claim 12, wherein the second control signal is an in-band audio signal.

18. The teleconferencing switching system of claim 12, wherein said first control signal is TCP/IP data.

19. The teleconferencing switching system of claim 12, wherein said second control signal is TCP/IP data.

20. The teleconferencing switching system of claim 12, wherein said computer is operable to recognize spoken words to mute a connection of each caller.

21. The teleconferencing switching system of claim 12, wherein said computer storage media is one or more magnetic or optical disk drives.

22. The teleconferencing switching system of claim 12, wherein said computer storage media is a semiconductor memory.

23. In a conference call of three or more parties where each party is coupled to the call through a corresponding switching system, a method for a conference call manager to suspend background audio signals sent into the conference call when a party to the call goes on hold, said method comprising the steps of:
   a) detecting the background audio signals when a party to said conference call suspends said party's participation in said conference call; and
   b) transmitting, via a computer associated with said corresponding switching system, a first control signal to a switching system coupled to said conference call that causes said switching system to suspend transmission of said background audio signals;
   wherein said corresponding switching system comprises a switch fabric as a conference call bridge, and wherein said first control signal instructs said switching system to disconnect a source of said background audio signals from said switch fabric or cause said source of said background audio signals to shut off to suspend said transmission of said background audio signals.

24. The method of claim 23, wherein said background audio signals are one of music and white noise.

25. The method of claim 23, wherein said first control signal is comprised of a dual-tone multi-frequency (DTMF) tone.

26. The method of claim 23, wherein said first control signal is a data packet transmitted over a SS7 signaling channel.

27. The method of claim 23, wherein the step of detecting said background audio signals further comprises the step of manually recognizing said background audio signals to be one music and white noise.

28. The method of claim 23, wherein said control signal is transmitted using TCP/IP data.

* * * * *